US008850405B2

(12) United States Patent
Fink et al.

(10) Patent No.: US 8,850,405 B2
(45) Date of Patent: Sep. 30, 2014

(54) GENERATING SOUND AND MINIMAL SECURITY REPORTS BASED ON STATIC ANALYSIS OF A PROGRAM

(75) Inventors: Stephen Fink, Yorktown Heights, NY (US); Yinnon A. Haviv, Beerotaim (IL); Marco Pistoia, Amawalk, NY (US); Omer Tripp, Har-Adar (IL); Omri Weisman, Tel Aviv (IL)

(73) Assignee: International Business Machines Corporation, Armonk, NY (US)

( * ) Notice: Subject to any disclaimer, the term of this patent is extended or adjusted under 35 U.S.C. 154(b) by 635 days.

(21) Appl. No.: 13/033,024

(22) Filed: Feb. 23, 2011

(65) Prior Publication Data

US 2012/0216177 A1    Aug. 23, 2012

(51) Int. Cl.
*G06F 9/44*    (2006.01)

(52) U.S. Cl.
USPC .......................................................... 717/131

(58) Field of Classification Search
USPC .......................................................... 717/131
See application file for complete search history.

(56) References Cited

U.S. PATENT DOCUMENTS

| 7,530,107 | B1 | 5/2009 | Ono et al. ........................ 726/25 |
| 7,900,193 | B1 * | 3/2011 | Kolawa et al. ................. 717/126 |
| 2004/0040017 | A1 * | 2/2004 | Kershenbaum et al. ...... 717/158 |
| 2006/0242466 | A1 * | 10/2006 | Tillmann et al. ................ 714/38 |
| 2008/0184208 | A1 * | 7/2008 | Sreedhar et al. .............. 717/128 |
| 2008/0275829 | A1 * | 11/2008 | Stull et al. ........................ 706/17 |
| 2008/0307266 | A1 * | 12/2008 | Chandrasekaran ............. 714/38 |
| 2009/0217248 | A1 * | 8/2009 | Bently et al. ................... 717/132 |
| 2011/0126288 | A1 * | 5/2011 | Schloegel et al. ............... 726/25 |

OTHER PUBLICATIONS

"TAJ: Effective Taint Analysis of Web Applications", Omer Tripp, et al., ACM 978-1-60558-392, 2009, 11 pgs.
OWASP, The Open Web Application Security Project, OWASP Top Oct. 2010, "The Ten Most Critical Web Application Security Risks", Release, (2003), (22 pages).
Feldthaus, et al., "The Big Manual for the Java String Analyzer", (Nov. 30, 2009), (43 pages).
Doug Baldwin, "Constructing Regular Expressions fran DFAs", SUNY Geneseo Department of Computer, (2006), (4 pages).
Wassermann, et al., "Sound and Precise Analysis of Web Applications for Injection Vulnerabilities", (2007), (10 pages).
Mohri, et al., "Regular Approximation of Context Free Grammars Through Transformation", (14 pages), Published 2001.

(Continued)

*Primary Examiner* — Li B Zhen
*Assistant Examiner* — Joanne Gonzales Macasiano
(74) *Attorney, Agent, or Firm* — Harrington & Smith; Louis J. Percello

(57) ABSTRACT

A method is disclosed that includes, using a static analysis, analyzing a software program to determine a number of paths from sources accepting information to sinks using that information or a modified version of that information and to determine multiple paths from the number of paths. The determined multiple paths have a same transition from an application portion of the software program to a library portion of the software program and require a same downgrading action to address a vulnerability associated with source-sink pairs in the multiple paths. The analyzing includes determining the multiple paths using a path-sensitive analysis. The method includes, for the determined multiple paths, grouping the determined multiple paths into a single representative indication of the determined multiple paths. The method includes outputting the single representative indication. Computer program products and apparatus are also disclosed.

21 Claims, 9 Drawing Sheets

(56) References Cited

OTHER PUBLICATIONS

Grove, et al., "A Framework for Call Graph Construction Algorithms", ACM Transactions on Programming Languages and Systems, vol. 23, No. 6, Nov. 2001,)pp. 685-746).

Minamide, "Static Approximation of Dynamically Generated Web Pages", May 10-14, 2005, (pp. 432-441).

Christensen, et al., "Precise Analysis of String Expressions", BRICS Department of Computer Science,(2003), (17 pages).

Cytron, et al., "Efficiently Computing Static Single Assignment Form and the Control Dependence Graph", Brown University, (1991), (pp. 451-490).

"IBM Rational AppScan: enhancing Web application security"; 2008; whole document (8 pages); IBM Corporation.

* cited by examiner

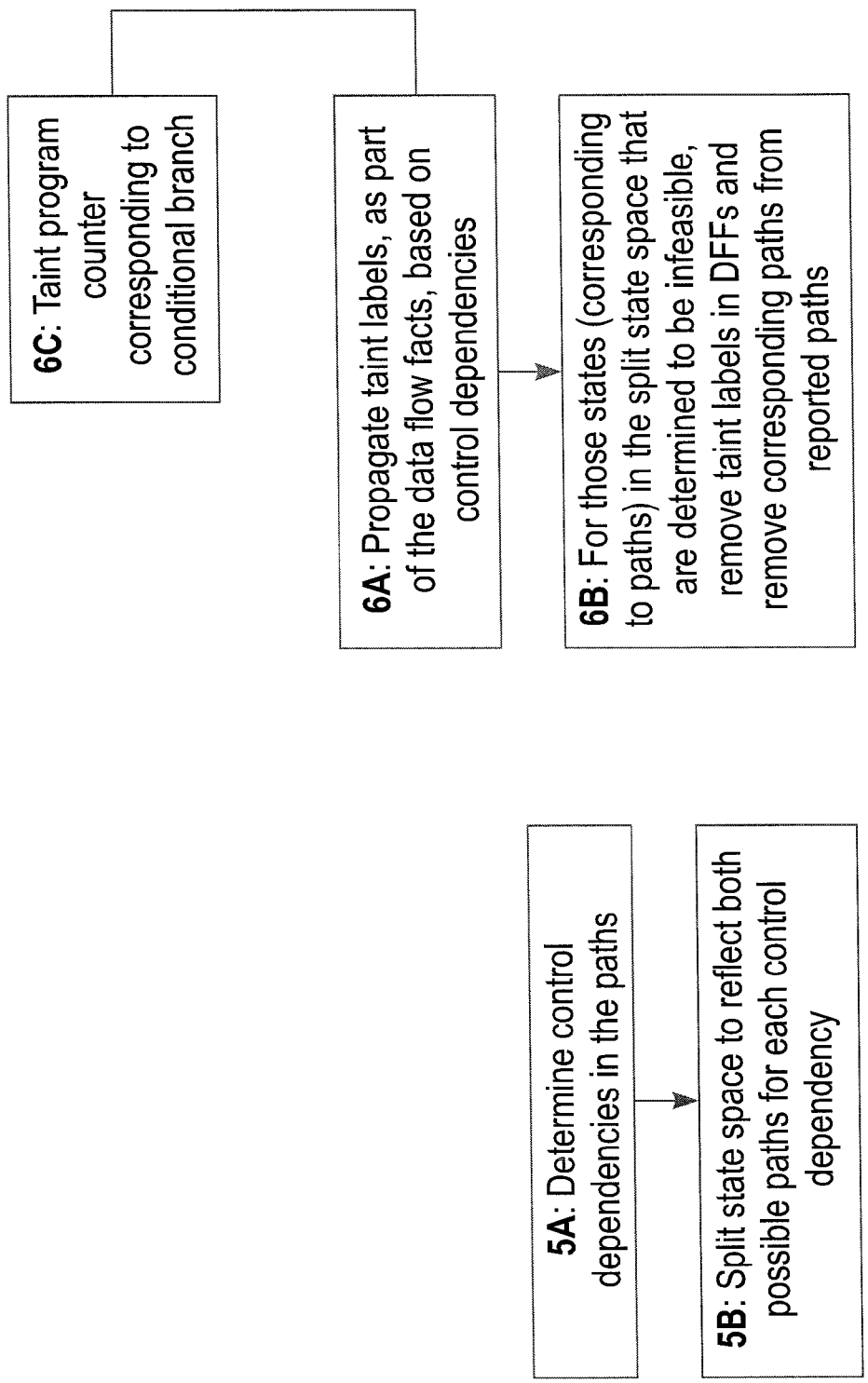

GENERATING SOUND AND MINIMAL SECURITY REPORTS BASED ON STATIC ANALYSIS OF A PROGRAM

BACKGROUND

This invention relates generally to analysis of software programs such as object code, byte code, source code, executable code, and libraries, and, more specifically, relates to static analysis of software programs.

Many software programs are divided into two parts, an application portion and a library portion. The library portion is typically written in a generic form to enable interfacing with many different application portions. The software program is created by a developer, and the developer generally only has control over the application portion of the software program.

Although the developer only has control over the application portion of the program, the developer or another user can still be interested in security risks created by the application portion and its interaction with the library portion. For instance, in a taint analysis of a software program, information paths are tracked from untrusted methods and parameters (called "sources" herein) in the application portion into security-sensitive areas (called "sinks" herein) in the library portion. Such information paths are computed by tracking data flows through the program. Each node in an information path is typically a program statement, and each edge represents the presence of flow of data between statements. Optionally, control flows can be part of this computation as well, thereby an edge in an information path. These paths can be analyzed to determine if downgrading actions (such as endorsers and declassifiers) can be used in the information paths to increase security.

One way to perform this analysis is via static analysis of the software program. A static analysis evaluates the program statically: that is, the program is not executed during this analysis. Certain models (such as call graphs and points-to graphs) may be created from the software program, based on a line-by-line interpretation of the program. Such models may be analyzed during the static analysis to determine information about the software program, such as the information paths described above.

One of the problems with a static analysis of information path is that the analysis generates a large report. This is true because each path from a source to a sink is typically reported and even moderately sized programs have many such paths.

SUMMARY

In an aspect of the invention, a method is disclosed that includes, using a static analysis, analyzing a software program to determine a number of paths from sources accepting information to sinks using that information or a modified version of that information and to determine multiple paths from the number of paths. The determined multiple paths have a same transition from an application portion of the software program to a library portion of the software program and require a same downgrading action to address a vulnerability associated with source-sink pairs in the multiple paths. The analyzing includes determining the multiple paths using a path-sensitive analysis. The method includes, for the determined multiple paths, grouping the determined multiple paths into a single representative indication of the determined multiple paths. The method includes outputting the single representative indication. Computer program products and apparatus are also disclosed.

BRIEF DESCRIPTION OF THE SEVERAL VIEWS OF THE DRAWINGS

FIG. 5 is a flowchart of an exemplary method for performing block 4B of FIG. 4;

FIG. 6 is a flowchart of an exemplary method for performing block 4H of FIG. 4;

DETAILED DESCRIPTION

Figure 1:
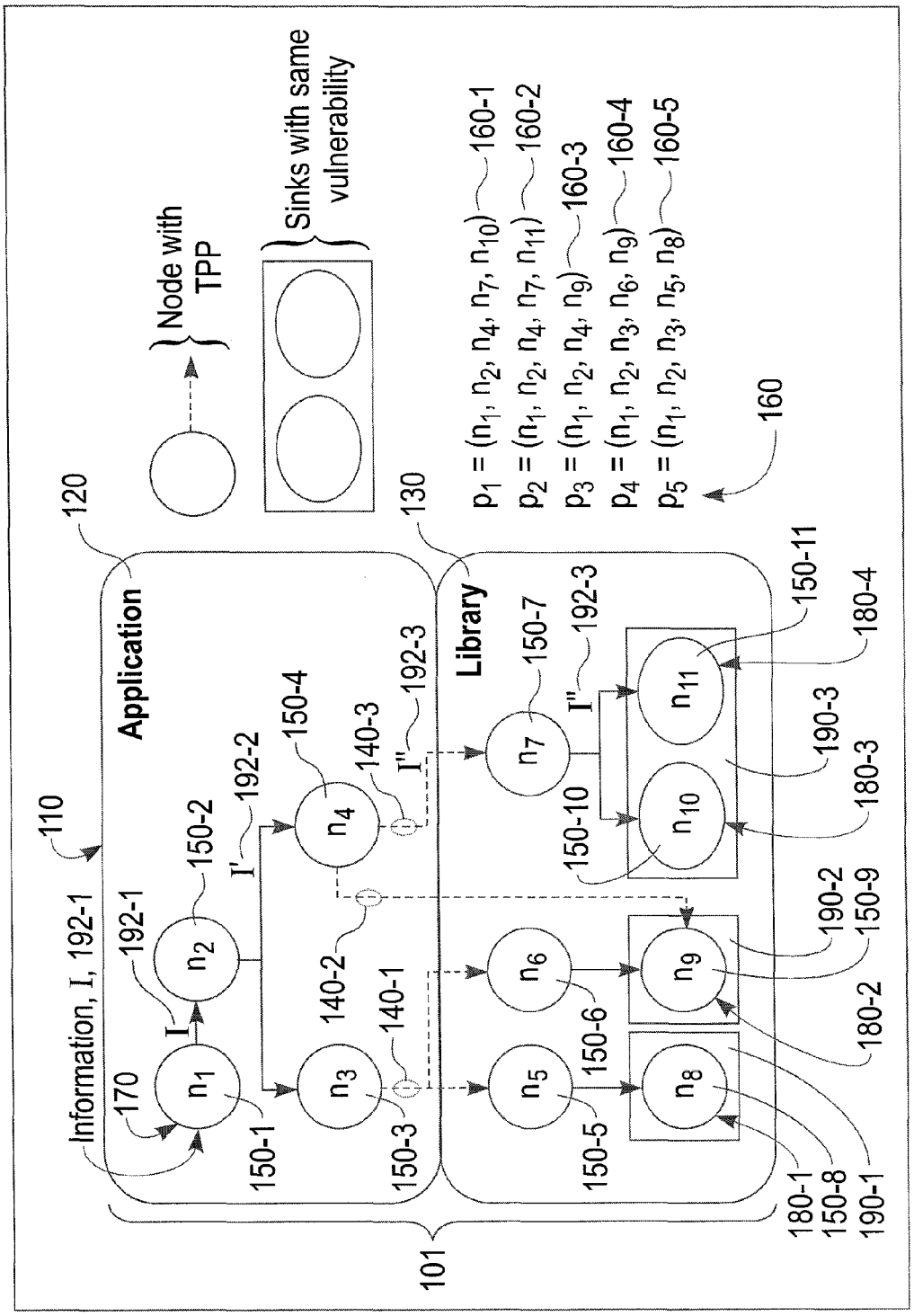
FIG. 1 is a call graph of a software program along with additional information, where the call graph is used to illustrate aspects of the invention.

One may expect a static analysis engine to report all paths of the form sr→tg where sr is the source point of a vulnerability (e.g., an issue), tg is the target point of the vulnerability, i.e., a sink, and no downgrading computation is present along the path from sr to tg. By "downgrading computation", it is meant software program that eliminates any potential vulnerability posed by the path from sr to tg.

The reason why such a computation is called a downgrading computation is that in information flow, any flow from "high" to "low" must be prevented, where "high" means "untrusted" in integrity and "private" in confidentiality, and "low" means "trusted" in integrity and "public" in confidentiality. Any such flow can be accepted as long as the "high" information has been "downgraded" and made sufficiently low. When performed for integrity, downgrading is called "endorsement" and consists of verifying that the data used in a security-sensitive computation is safe to be used. This can be done by verifying the data through special functions. Such functions can simply verify the data and reject it if the data is unsafe for use while leaving the data as is, or actually modify the data and make it safe for use. For example, if user-provided data is about to become part of a blog or wiki and displayed on other users' computers, then that data cannot contain JavaScript code, or that code will be executed on all those other users' computers. Endorsement functions can either reject user-provided data containing JavaScript code or modify that data by removing the JavaScript code. When performed for confidentiality, "downgrading" is called "declassification", and consists of verifying that the data being released does not expose secret information to unauthorized users. This can be done through declassification functions, which can either reject the data being released if it exposes secret information, or actually modify the data and make it safe to be exposed to those users. For example, if the secret data is someone's credit card number, a declassification function can reject that data and prevent the data from being released, or the declassification function could declassify the data, e.g., by only revealing the last four digits.

However, from the perspective of a user, reporting paths from sources to targets that are not intercepted by a downgrading computation may be too much information, since many of these paths might be redundant. In fact, they might just expose one logical flaw and there is no reason to report multiple paths. Reporting redundant information can cause developers to lose interest in the reports, especially when the flaws reported are very similar and many flaws can be fixed at once by the same downgrading logic.

In an embodiment, an algorithm is described for the generation of compact, effective user-level reports by a static analysis engine. In an exemplary embodiment, the report is compact in the sense that the number of vulnerabilities the report lists is minimal. The report is also effective, in the sense that a user (e.g., a designer of the application portion of a software program) need only fix all the vulnerabilities in the report in order to address all the problems found by the engine.

Unlike previous work, exemplary embodiments herein can compute TPPs (defined below) and consolidate reports soundly even in the case in which the underlying taint analysis tracks control dependencies in addition to data dependencies. In fact, previous work only dealt with flows that contain data dependencies. The instant is not limited to data dependencies but can consolidate flows also when such flows include both data and control dependencies.

Another major difference with previous work is that previous work only dealt with integrity problems and so in that case the downgraders had to be integrity downgraders, or endorsers, and in particular, they had to be those types of downgraders that modify their input and make the input safe to be used. The instant invention is not limited to integrity downgraders and can deal with any other type of downgrader that can arise in an information-flow setting. For example, confidentiality downgraders (declassifiers) and anonymity downgraders (obfuscators) are all supported by the exemplary embodiments.

Finally, another major aspect of the instant invention that is not covered by previous work is that the downgraders it supports can also be those that do not modify the input they receive, but rather simply check whether the input is safe to be used, thereby allowing the programs using those downgraders to either accept or reject the input. Such downgraders are known as validators. Previous work was not only limited to integrity downgraders as observed above, but also to the special type of integrity downgraders, called sanitizers, that modify the input they receive. The extension from sanitizers to validators is non-trivial since the extension requires accounting for conditional statements in the flows that are computed. In other words, the flows are computed and condensed using a path-sensitive analysis. This enhancement was not supported in previous work.

An approach is now described to address the potential redundancy in paths. Considering the insertion of downgrading logic into a path as a downgrading action, an approach is proposed in an exemplary embodiment whereby paths are grouped together according to the downgrading actions to which the paths map. The engine can then report one representative per group, rather than all the paths.

Formally, a Transition Program Point (TPP) is defined as the last statement along a path from a source to a target where the path transitions from application code (e.g., the project's code) to library code (e.g., one of the libraries referenced by the project). This means that the information flow edge rooted at that statement connects a statement in application code to a statement in library code. This is the last of such edges in the path. It is possible that multiple such edges exist in one path since it is not guaranteed that once a flow has reached a library the flow will not go back into application code. For example, an application can call a library method and pass the library method a parameter p of type T, where T is a type defined in application code. This is possible as long as T is compatible with the type (i.e., is a subtype) of the type expected by that method. Subsequently, that library can call a method on p, which causes the flow to return into application code. With this definition, an equivalence relation ~is introduced, as follows. Let U and V be two information-flow paths. Then U ~V if and only if (1) $U|_{TPP} \equiv V|_{TPP}$ (where $X|_{TPP}$ is the portion of path X extending from the source to the TPP inclusive), and (2) U and V require the same downgrading action (e.g., such as insertion of an endorser or declassifier immediately prior to the TPP). The equivalence classes induced by the ~relation are the sets of paths into which paths are partitioned and classified.

To clarify the discussion, consider a concrete example. See FIG. 1, which is a call graph 110 of a software program 101 along with additional information, where the call graph 110 is used to illustrate aspects of the invention. In this example, there are 11 nodes 150 and three TPPs 140: TPP 140-1 from node 150-3, $n_3$; TPP 140-2 from node 150-4, $n_4$; and TPP 140-3 from node 150-4, $n_4$. Each node 150 is a distinct portion of the software program 101. For instance, each node may be a method of an object. As another example, each node 150 may be a subroutine in the software program 101.

Suppose that the analysis at hand is taint analysis, which is a form of information-path security analysis that tracks values (e.g., text or numbers or both) originating from untrusted methods and parameters (i.e., sources in the application portion 120 of the software program 101), in order to establish whether they flow into security-sensitive areas of the application (i.e., sinks in the library portion 130 of the software program 101). There are five paths 160 from a source to a sink in FIG. 1. There is one source 170 (node 150-1, $n_1$) and four sinks 180-1 (node 150-8, $n_8$), 180-2 (node 150-9, $n_9$), 180-3 (node 150-10, $n_{10}$), and 180-4 (node 150-11, $n_{11}$). The four sinks 180 have the following vulnerabilities: sink 180-1 has vulnerability 190-1; sink 180-2 has vulnerability 190-2; and sinks 180-3 and 180-4 have vulnerability 190-3.

The source 170 accepts information 192-1, I, and this information flows through the paths 160. In one simple example, the information 192-1 flows to the node 150-2, $n_2$, and the node 150-2, $n_2$, operates on the information to produce modified information 192-2, I'. This information 192-2 passes to the node 150-4, $n_4$, which operates on the information to produce modified information 190-3, I", which then is passed through node 150-7, $n_7$, and is used by sink 180-4, $n_{11}$. In the case of taint analysis, the information 192-1, I, is generally text supplied, e.g., by an external user (that is, text supplied by any element external to the application portion 120). The nodes 150-2 and 150-4 can operate on the text through such operations as concatenation, insertion, replacement, and the like. A sink 180 therefore may operate on the original information 192-1, I, or a modified version (e.g., 192-2, I', or 192-3, I") of the original information 192-1.

Considering the call graph 110 illustrated in FIG. 1, U is defined as the path 160-1, $p_1$, and V is defined as the path 160-2, $p_2$. Since, in the case of taint analysis, the downgrading action derives from the sink, and sinks (180-3 and 180-4) are associated with the same vulnerability (190-3) and require the same type of downgrading logic (e.g., implemented by an endorser or declassifier), and since, moreover, U and V transition from application code to library code at the same point (TPP 140-3), it holds that U ~V.

If instead U is defined as the path 160-3, $p_3$, and V is defined as the path 180-4, $p_4$, then U and V do not share the same TPP (instead, have TPPs 140-2 and 140-1, respectively), and thus belong in different equivalence classes, despite flowing from the same source 170 to the same sink 180-2. The justification for this is that, potentially, the downgrading action that a developer may introduce for U will not remove the security vulnerability exposed in V (e.g., if a downgrading routine is called from node 150-3, $n_3$). Similarly, the paths 160-4, $p_4$, and 160-5, $p_5$, are distinguished, although they originate from the same source 170 and pass through the same TPP 140-1, since they end at sinks 180-1 and 180-2, respectively, corresponding to different vulnerabilities 190-1 and 190-2, and thus require (potentially) different downgrading actions. To conclude, of the five source-to-sink paths 160 in the example, a TPP-based report would include only four, starting at $n_1$ and ending at $n_8$ (path 160-5), $n_9$ (two paths 160-3 and 160-4), and $\{n_{10}, n_{11}\}$ (the paths 160-1 and 160-2).

The exemplary analysis of the example in FIG. 1 demonstrates the twofold advantage of the TPP-based method of classification: (1) the part of path X that is completely under the developer's control is precisely $X|_{TPP}$; and (2) if path X is a representative of equivalence class $[X]_{\sim}$, then once the security threat exposed in X is eliminated, all the other paths in $[X]_{\sim}$ will be appropriately downgraded as well.

This action-oriented algorithm to categorize and classify reports is sound because, for each vulnerable flow f, exactly one representative of f's equivalence class is reported, with the property that downgrading that representative will downgrade also all the flows in the its equivalence class, including f. Therefore, after all the reported flows (which form a subset of all the flows that would have been reported if the algorithm of this invention had not been applied) are downgraded, this algorithm guarantees that all the flows that would have been reported if this algorithm had not been applied are downgraded as well. This compact way to report flows, therefore, strongly improves the developer's experience while not compromising the security of the end result.

Figure 2:
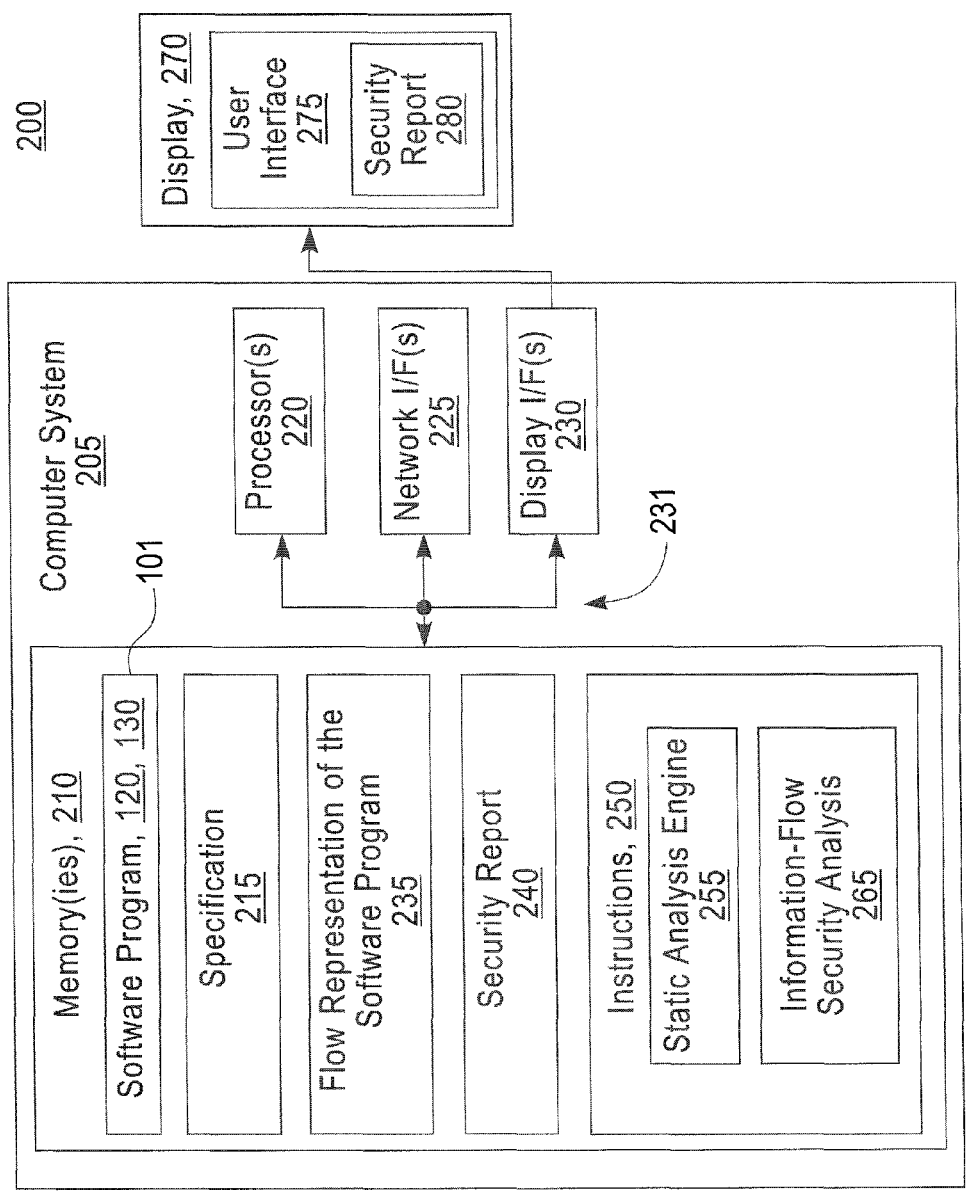
FIG. 2 is a block diagram of an exemplary system for generating security reports based on static analysis of a program.

Turning to FIG. 2, a block diagram is shown of an exemplary system 200 for generating user-level reports based on static analysis of a program. System 200 includes a computer system 205 and a display 270. The computer system 205 includes one or more memories 210, one or more processors 220, one or more network interfaces 225, and one or more display interfaces 230, all interconnected by one or more buses 231. A display interface 230 is used to drive the display 270. The one or more memories include a software program 101, a flow representation 235 of the software program 101, a specification 215, a security report 240, and instructions 250. Typically, a call graph such as call graph 110 shown in FIG. 1 would be used as flow representation 235, but other flow representations may be used, such as a points-to graph. The software program 101 includes both an application portion 120 and a library portion 130 (see FIG. 1) and may include object code, byte code, source code, executable code, or some combination of these.

Figure 8:
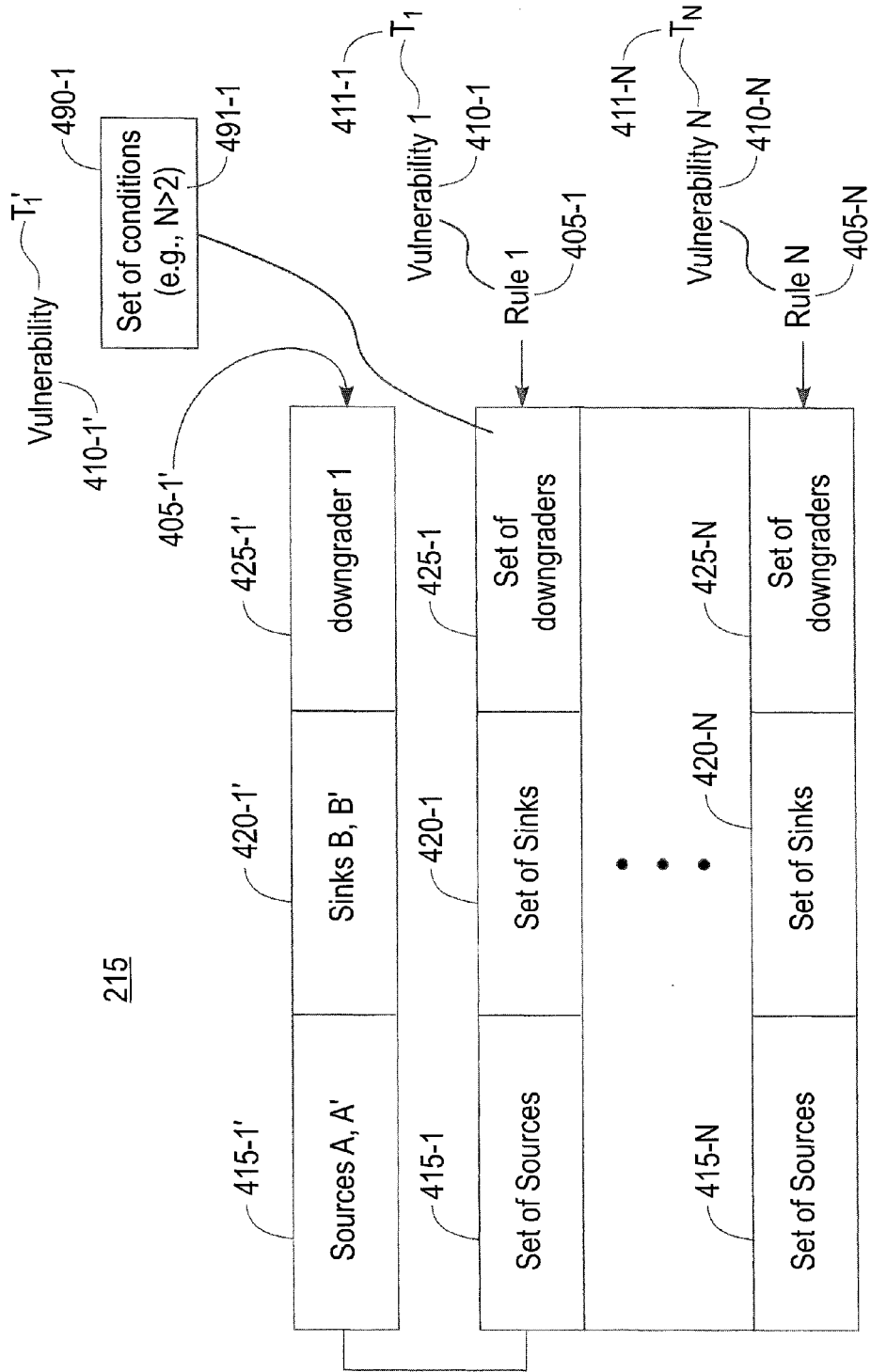
FIG. 8 is an example of a specification containing a number of rules.

The specification 215 provides input to the information-flow security analysis portion 265 to allow the information-flow security analysis portion 265 to perform the information-flow security analysis as described above and further described below, e.g., in relation to FIG. 3. An exemplary specification 215 is shown in FIG. 8 and described in more detail below.

The instructions 250 include computer readable program code that cause the computer system 205, in response to the one or more processors 220 executing the instructions 250, to perform some or all of the operations described herein. The instructions are organized, in this example, into a static analysis engine 255 that analyzes the software program 101 to create the flow representation 235. The static analysis engine 250 also includes an information-flow security analysis portion 265, which performs information flow security analysis. Such security analysis includes the taint analysis previously described. Another analysis could be a confidentiality analysis. The information-flow security analysis portion 265 also produces the security report 240. This security report 240 should contain a compact report using the techniques described above (and also below), as compared to a report generated using traditional techniques.

The security report 240 may be communicated to a user, e.g., via one or more wired or wireless network interface(s) 225 and by the information-flow security analysis portion 265. The security report 280 may also be displayed to a user, e.g., via display 270, which shows a user interface 275 having a version of the security report 240 (shown as security report 280). The information-flow security analysis portion 265 can cause the security report 280 to be displayed. The two security reports 240, 280 may be the same or different. For instance, a security report 240 sent via a network interface 225 may be text-based (e.g., HTML, hypertext markup language, based), while the security report 280 may be text and graphics based or solely graphics based (as non-limiting examples).

The static analysis engine 255 could be, e.g., a version of the IBM Rational Software analyzer static analysis tool, or a version of a WALA (T. J. Watson Libraries for Analysis) static analysis tool. These versions would be modified in order to perform the operations described herein.

Figure 3:
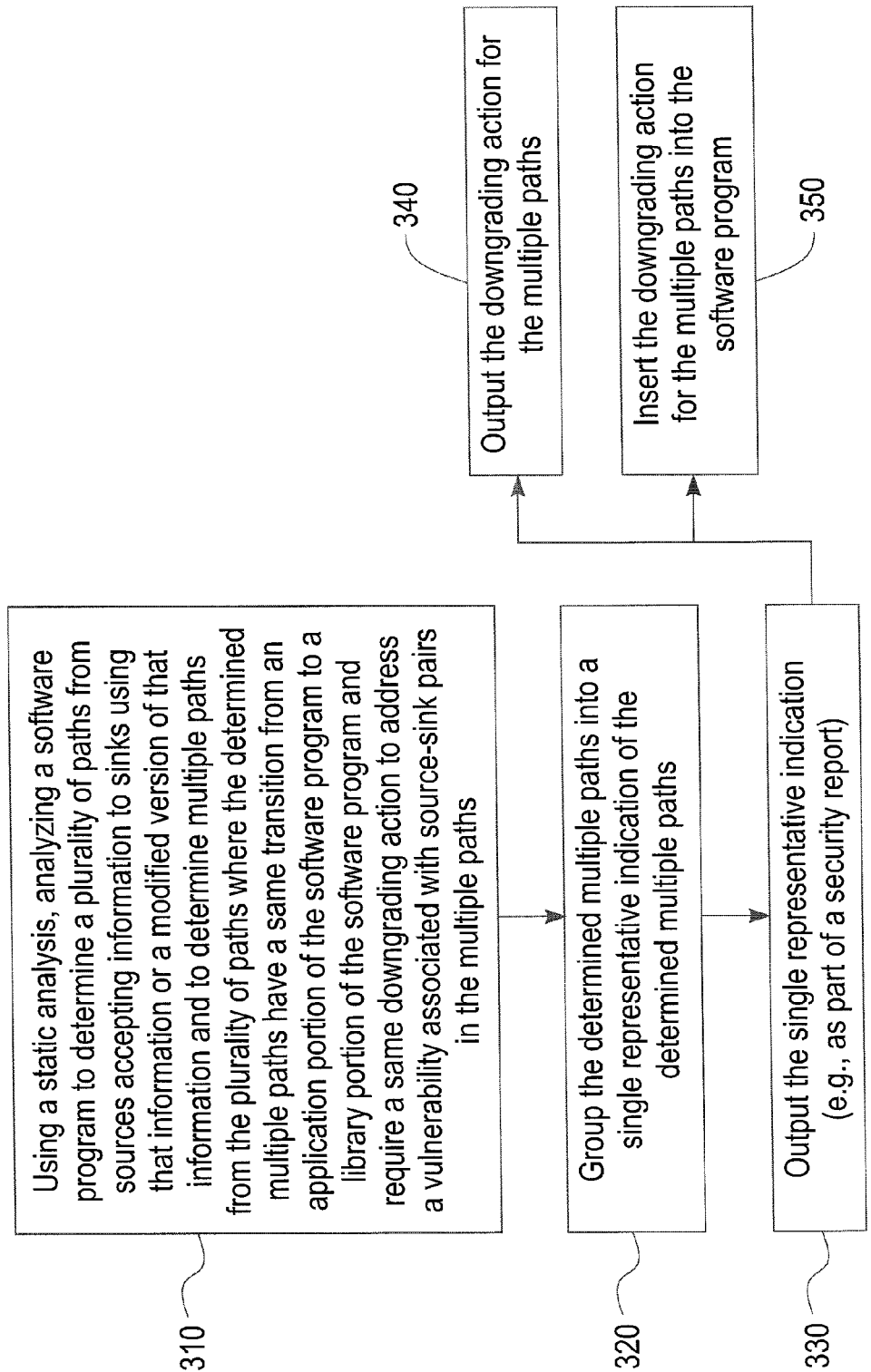
FIG. 3 is a flowchart of an exemplary method for generating security reports based on static analysis of a program.

Turning to FIG. 3, this figure shows a flowchart of an exemplary method 300 for generating user-level reports based on static analysis of a program. The operations in method 300 are performed, e.g., by the information-flow security analysis portion 265. In block 310, using a static analysis, a software program is analyzed to determine multiple paths from sources accepting information to sinks using that information or a modified version of that information. The determined multiple paths have a same transition from an application portion of the software program to a library portion of the software program and require a same downgrading action to address a vulnerability associated with source-sink pairs in the multiple paths An exemplary algorithm for this has been described above. The transition corresponds to the TPP.

In block 320, the determined multiple paths are grouped into a single representative indication of the determined multiple paths. In block 330, the single representative indication is output, e.g., as part of a security report.

Blocks 310, 320, and 330 would be performed until all paths 160 through the software program 101 have been examined.

The blocks 340 and 350 are optional. However, in block 340, downgrading actions for the multiple paths are output, as described in more detail below. In block 350, the downgrading action for the multiple paths is inserted in the code for the application portion 120 of the software program 101. The insertion should be immediately prior to the transition and its corresponding TPP. In other words, if a call is made to a library on line 15 of a software program 101, the insertion should occur by adding a call to an appropriate downgrader (if a downgrader is the proper entity to address a vulnerability with the sink in the library) immediately prior to line 15 (e.g., a new line 14').

Figure 4:
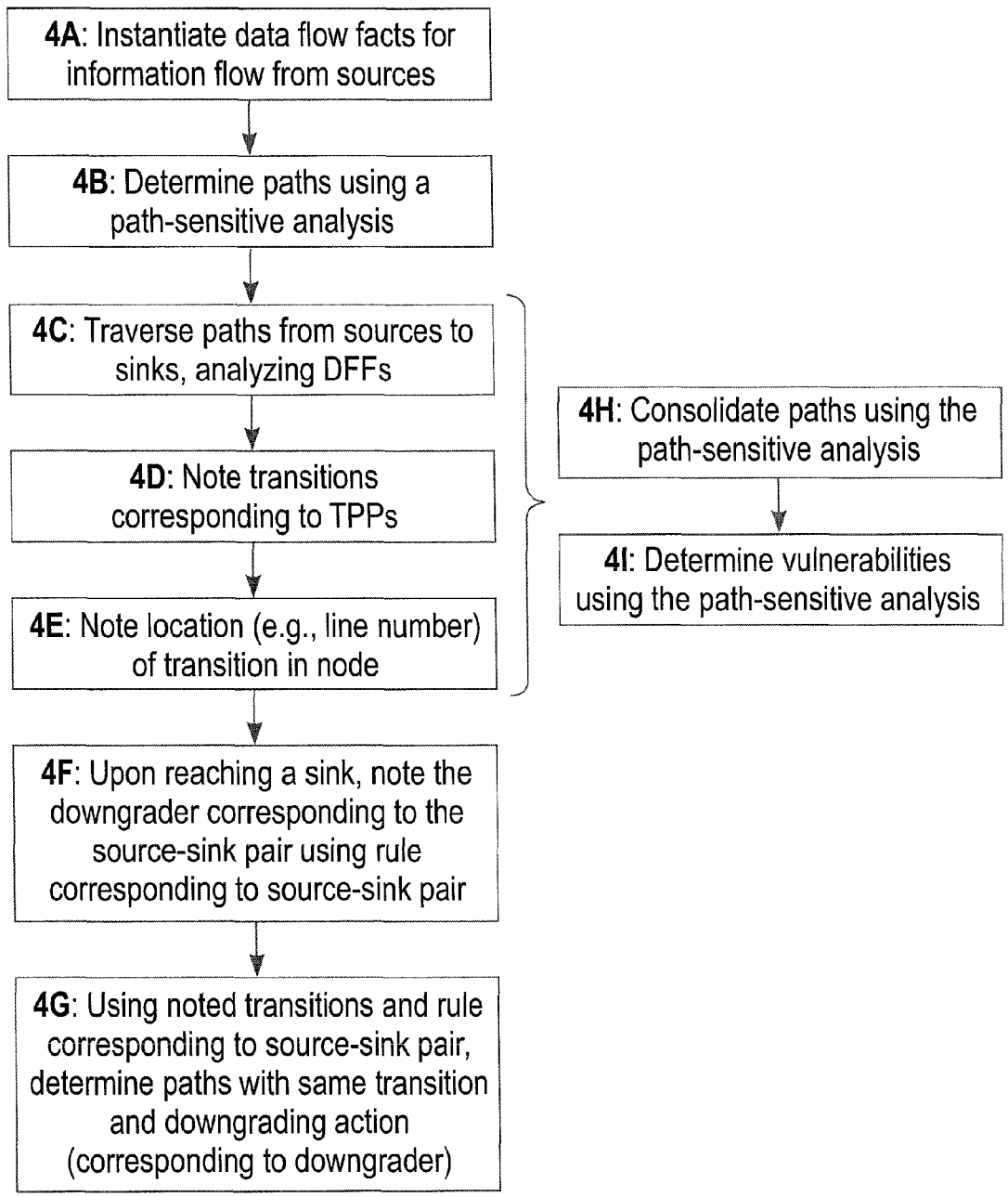
FIG. 4 is a flowchart of an exemplary method for generating security reports based on static analysis of a program for performing portions of FIG. 3.

Additional possible algorithm operations for certain of the blocks in FIG. 3 are described in FIGS. 4-7. Turning to FIG. 4, in block 4A, data flow facts are instantiated for information flow from sources. In block 4B, paths are determined using a path-sensitive analysis. This is described in more detail in reference to FIG. 5. In block 4C, paths are traversed from sources to sinks, while analyzing the data flow facts. In block 4D, transitions from the application portion 120 to the library portion 130 corresponding to TPPs are noted. The location of the transitions in the nodes, such as by recording the line number of the application portion 120 at which the transition occurs, is noted in block 4E. In block 4F, upon reaching a sink, the downgrading routine corresponding to the source-sink pair is noted. This block is performed using, e.g., a rule corresponding to the source-sink pair. Rules are part of the specification 215, described in more detail below. In block 4G, using noted transitions and rules corresponding to source-sink pair, paths with a same transition and downgrading action are determined. It is noted that, in an exemplary embodiment, the rules may be used to determine a downgrader corresponding to the source-sink pair, and the downgrading action is then immediately apparent from the downgrader. That is, insertion of the downgrader immediately before the transition (corresponding to the TPP) will address the security threat associated with the path from the source to the sink.

Figure 7:
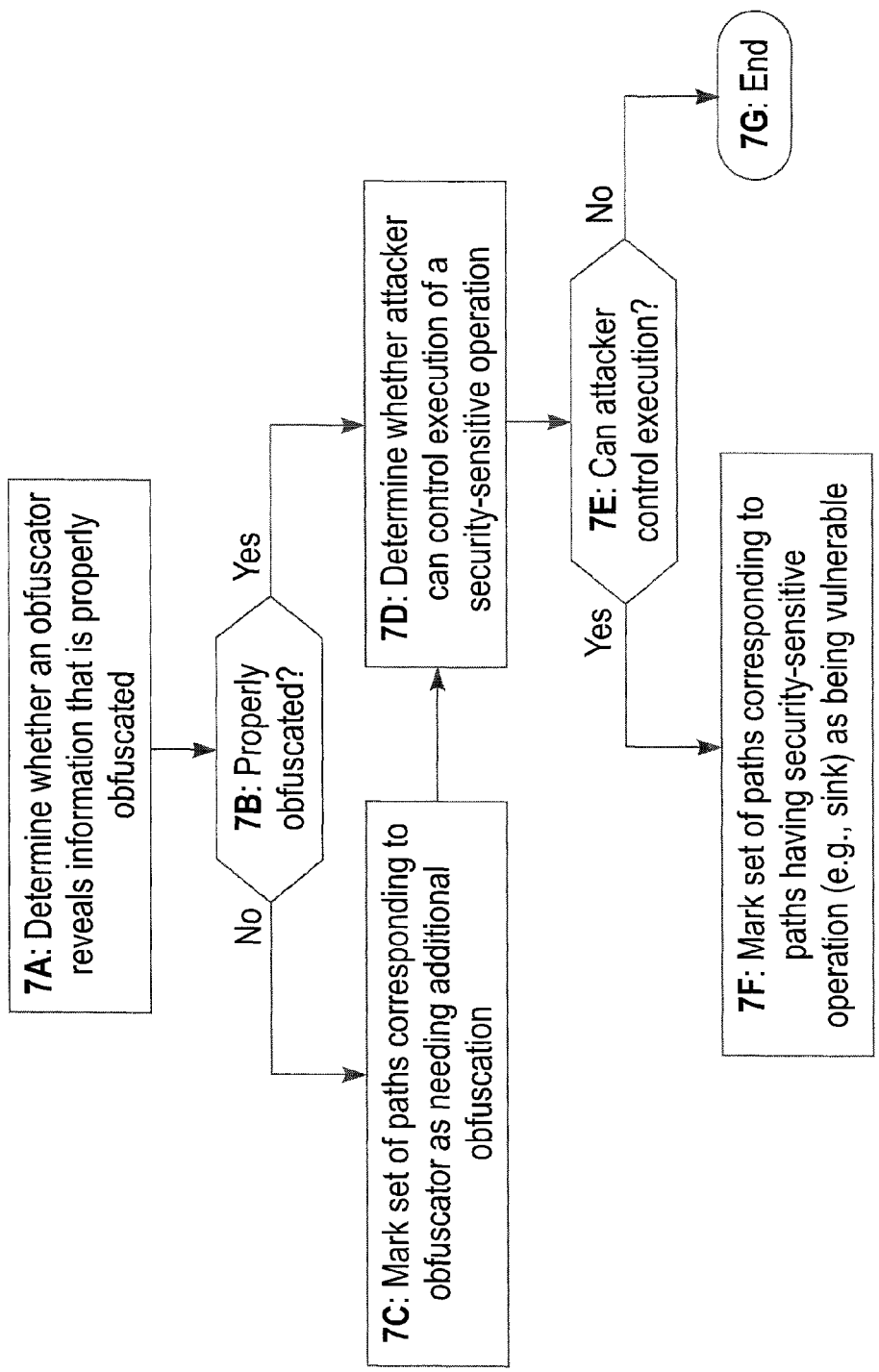
FIG. 7 is a flowchart of an exemplary method for performing block 4I of FIG. 4.

Certain portions of blocks 4C, 4D and 4E may be performed by consolidating paths using the path-sensitive analysis (block 4H, described in more detail in reference to FIG. 6) and by determining vulnerabilities using the path sensitive analysis (block 4I, described in more detail in reference to FIG. 7). As a preliminary example, a path-sensitive analysis is an algorithm that is able to incorporate branching knowledge into the data-flow facts the analysis propagates. Consider, for example, the following code:

```
String s = getUserInput( );
if (s.length( ) == 3) {
    String s1 = s.substring(2);
    assert (s1.length( ) == 1);
}
```

In this case, if the analysis tracks strings (i.e., it is a string analysis), and it is also path sensitive, then the analysis would be able to prove that the assertion does not fail, since going into the true branch of the if condition, the analysis would incorporate the fact that the length of s is three into its representation of s (or rather, the string value pointed-to by s). Thus, the path(s) that might have included the assertion may be consolidated (block 4H) because the path leading to the assertion need not be shown, as the assertion is proven to be true. If the assert function has a vulnerability associated with it, then the vulnerability could be determined (if the assert would not fail) (block 4I) based in part on the path including the assert function being analyzed.

It is noted that although downgraders are mainly described herein, the invention is applicable to other endorsers, such as validators. A downgrader validates or modifies an input. A downgrader of the latter type typically examines the content of a string and replaces/removes substrings not suitable for a corresponding sink. With regard to those downgraders that perform validation, a validation routine does not modify its input. Instead, this routine has a Boolean return value, which indicates whether the input's format conforms to the constraints imposed by the sink. If the answer is yes, then the validation routine typically returns true. Otherwise, the routine may return false or throw an exception or another type of error message.

Referring now to FIG. 5, a flowchart is shown of an exemplary method for performing block 4B of FIG. 4. In block 5A, control dependencies are determined. A control dependency occurs any time a flow may be diverted from a current path to another path. That is, a control dependency holds between statements, if the result of the first statement controls whether the second statement will be executed. Here is a simple example:

```
s1: if (b) {
s2: x.f = y;
}
```

The statement s1 controls whether the statement s2 will be run, and thus statement s2 is control dependent on the statement s1. Other examples occur for obfuscators and validators. A validator, for instance, is a method that makes a Boolean judgment concerning its input argument in a pure fashion (i.e., without side effects on the argument). Using a validator inside the client code (e.g., application 120) would yield a control-flow branch. If the validation succeeds, one branch is taken. Otherwise, the other branch is taken.

In block 5B, these possible branches (each branch corresponding to a path) are taken into account by splitting the state space to reflect both possible paths for each control dependency. Using the example with statements s1 and s2 above, a state space would be divided to correspond to one path having statement s1 and another path having statement s2. Thus, one path is determined for states where s is false, and another path is determined for states where s is true.

Referring to FIG. 6, a flowchart is shown of an exemplary method for performing block 4H of FIG. 4. In block 6A, taint labels are propagated, as part of data flow facts (DFFs), based on control dependencies determined in block 5A. One way to perform this is to taint a program counter corresponding to a conditional branch (block 6C). For the example:

```
s1: if (b) {
s2: x.f = y;
}
```

Figure 10:
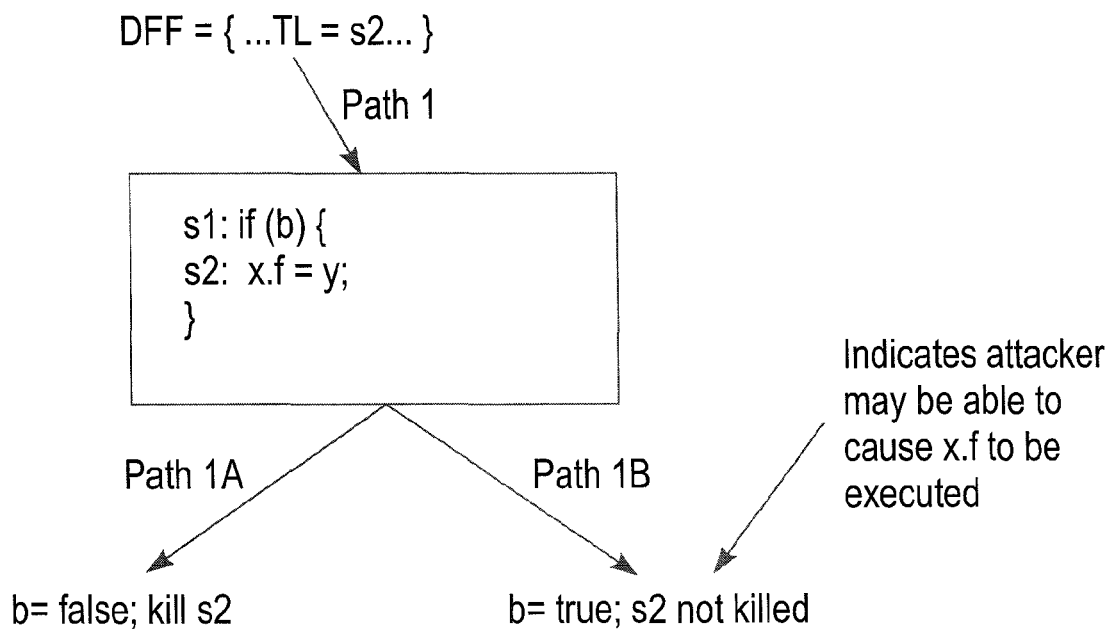
FIG. 10 shows a code snippet and propagation of data flow facts through paths through the snippet.

In block 6C, the program counter (s2 in the above example) is tainted. This reflects that the attacker can (or rather, may be able to) control whether the statement at program counter s2 would get executed. Turning to FIG. 10 in addition to FIG. 6, FIG. 10 shows an example using the code snippet above. A set of data flow facts (DFF) includes a taint label, TL, which has a value of s2. There is a path that comes into the code snippet. For the state(s) where b=false, the TL s2 can be killed (path 1A, which is one possible "branch" from the code snippet). For the state(s) where b=true, the TL s2 is not killed and path 1B (another possible "branch" from the code snippet) is followed.

In block 6B, for those states (corresponding to paths/branches) in the split state space that are determined to be infeasible, taint labels are removed in DFFs, and corresponding paths are removed from reported paths. That is, in path 1A, the TL s2 is removed (e.g., "killed"), and the path 1B is not reported because path 1B will not be taken according to the state b=false. This makes for a more concise report.

As another example of FIGS. 6A and 6B, unless one of the options is infeasible based on the abstract state at the point when the validator is called. The assertions made by a validator can be used by the analysis to refine its representation of the data flowing into the validator call, which may affect the security labels associated with the data. Here's an example:

```
boolean isNotXssPayload(String s) {
    return !s.contains("<");
}
```

In this simplistic example, the validator returns true if and only if s does not contain the "<" character. If the analysis originally tracks s with an XSS taint label (block 6A), then the analysis can remove the XSS taint label (block 6B) from s in states where the result from the validator is true. The corresponding path would also be removed from the reported paths (block 6B).

Turning now to FIG. 7, a flowchart is shown of an exemplary method for performing block 4I of FIG. 4. In block 7A, it is determined whether an obfuscator reveals information that is properly obfuscated. Exemplary embodiments herein allow information-flow problems that are not necessarily related to integrity to be handled. For example, obfuscation, which is a form of downgrading that can be used in anonymity, may be handled. A function is an obfuscator if the function masks the identity of an individual in a set of multiple individuals. A form of obfuscation is aggregation. For example, given the salaries of N individuals (all of which are confidential), a form of obfuscation that maintains anonymity consists of revealing only the average of those salaries: $A=(S1+S2+\ldots+SN)/N$. Of course, if $N=1$, then $A=S1$, and revealing A would also reveal S1, and so the obfuscator must include checks that verify that $N>1$. Even $N=2$ could be a problem because the person whose salary is S1, once A is revealed, would know S2 (and the person whose salary is S2 would know S1).

An exemplary analysis, being path sensitive, can detect that obfuscators are revealing information that is properly obfuscated (and so information is revealed only under certain conditions, e.g., $N>2$ in the example above) (block 7A). When detecting tainted flows and when recommending the insertion of appropriate downgrading actions for an equivalence class of paths, this exemplary analysis can do this properly not only in the case of integrity, but also in the case of anonymity and confidentiality problems.

Thus, in block 7B, it is determined if the information is properly obfuscated. If so (block 7B=YES), the method performs block 7D. If not (block 7C=NO), the set of paths (e.g., the equivalence class of paths) corresponding to the obfuscator are marked as needing obfuscation. This marking is then used during blocks 330 and 340, e.g., to present an output warning of the obfuscation problem (see FIG. 9).

In block 7E, it is determined if an attacker can control execution of a security-sensitive operation. Returning to FIG. 10 in addition to FIG. 7, if the TL of s2 is not killed, this indicates that an attacker may be able to cause x.f to be executed. This is a potential security violation that should be reported (e.g., even if the path 1B contains a proper downgrader). Thus, if an attacker can control execution (block 7E=YES), the set of paths (e.g., including path 1B) having the security sensitive operation (e.g., x.f) are marked as being vulnerable. These paths may then be reported (see FIG. 9). If an attacker cannot control execution (e.g., b is never true) (block 7E=NO), the method ends in block 7G.

FIG. 8 is an example of a specification 215 containing a number of rules 405. In this example, there are rules 405-1 through 405-N. Each rule 405 is associated with a corresponding vulnerability 410 (e.g., an issue). Each rule 405 has an associated set of sources 415, a set of sinks 420, and a set of downgraders 425. Each vulnerability 410 may be associated with a type, T, 411. Also, each set of sources 415 may contain indications of one or more sources (e.g., of the names of methods, such as "Object.Method", or indications of types of methods, or any other indication), and each set of sinks 420 may contain indications (e.g., of the names of methods, such as "Object.Method", or indications of types of methods, or any other indication) of one or more sinks.

As an example of the information in specification 215, a vulnerability 410 could be structured query language (SQL) injection (SQLi), and the rule 405 could provide a downgrader 425-1 that would perform operations on the information (e.g., information 192-1 or modified information 192-2 or 192-3) flowing to the set of sinks 420-1 to prevent SQLi.

As a specific example (using rule 405-1'), any input coming from source A that can influence the value passed to sink B constitutes a potential vulnerability 410-1' of type T 411-1'. However, any input coming from source A' and flowing to sink B' also constitutes a potential vulnerability of type T, assuming that both sources A and A' belong to the set of sources 415-1' of the rule 405-1' representing vulnerability 410-1' having type T 411-1', and also sinks B and B' both belong to the set of sinks 425-1' of the same rule 405-1'. To prevent such vulnerability, any downgrader (e.g., Downgrader 1) in the set of downgraders 425-1' of the rule 405-1' will have to be used to modify the untrusted input and filter out any vulnerability.

Each set of downgraders 425 may also have a set of conditions 490. In this example, only one set of conditions 490-1 is shown. Each set of conditions 490 contains conditions that have to be met for a downgrader, such as the condition 491-1 of $N>2$ as described above in reference to obfuscation. That is, for a downgrader 425-1' the number of values, N, that must be used when producing output is at least two according to the condition 491-1.

Figure 9:
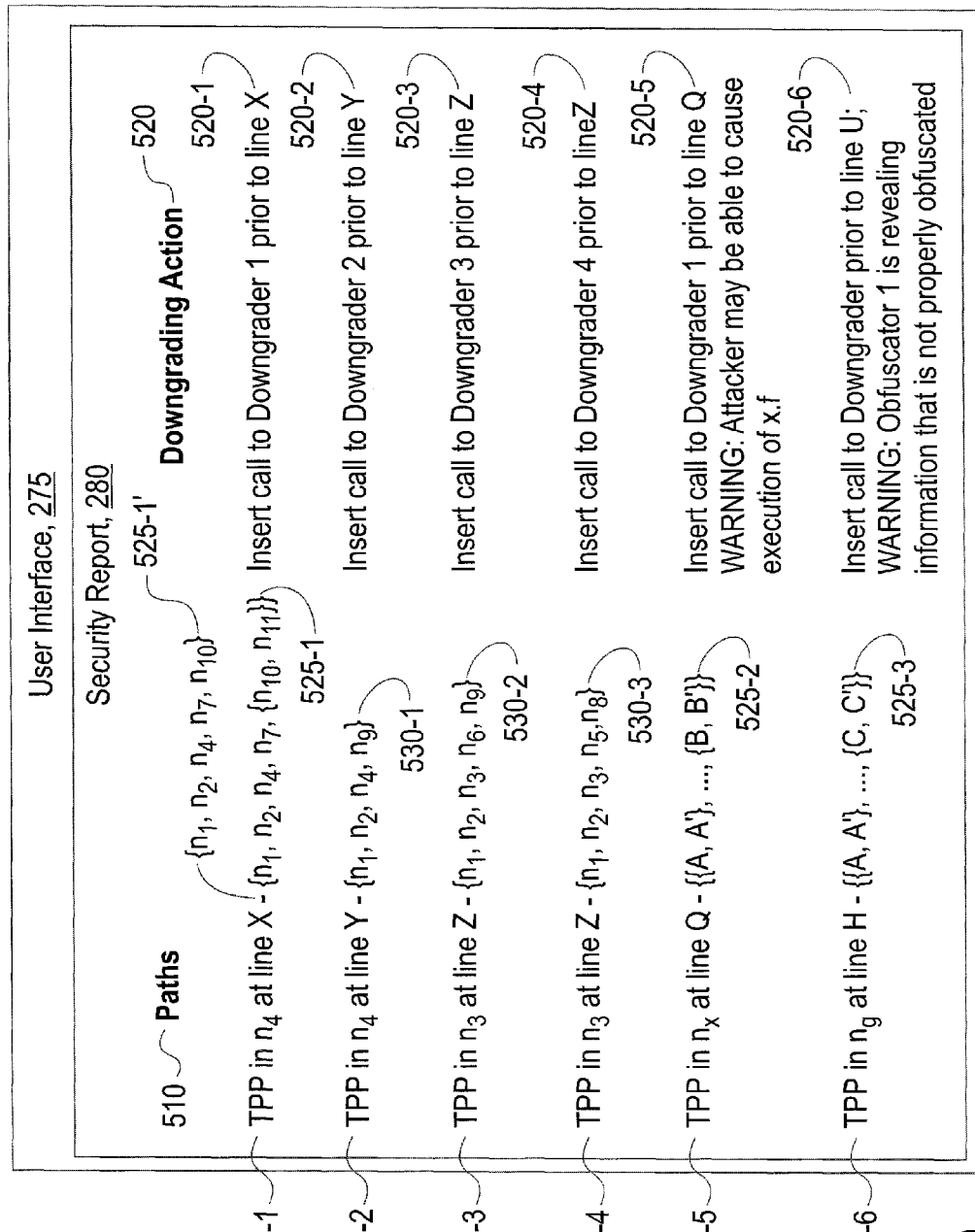
FIG. 9 is an example of a security report shown on a user interface of a display.

Turning now to FIG. 9, an example is shown of a security report 280 shown on a user interface 275 of a display. The paths 510 are shown on one side of the security report 280, and the downgrading actions 520 are shown on the other side of the security report 280. The paths 510 include one single representative indication 525-1 of the multiple paths 160-1, $p_1$, and 160-2, $p_2$ (see the examples in FIG. 1). This single representative indication 525-1 is merely exemplary and any item indicating multiple paths may be used. For instance, single representative indication 525-1' is shown, which is similar to 515-1 except that node $n_{11}$ is not displayed. The displayed paths 510 also include representations 535 of the locations of the TPPs in each node 150 in the application portion 120, and single paths 530-1 through 530-2. The paths 510 include one single representative indication 525-2 of the multiple paths from the set of sources 415-1' (sources A, A') to the set of sinks 420-1' (see the examples in FIG. 4).

The downgrading actions 520-1 through 520-6 are, in an exemplary embodiment, based on the rules 405, and include locations at which to call the appropriate downgrader (the downgrader determined based on the rules 405 corresponding to each source-sink pair). It is noted that the downgrading action 520-1 will correct the vulnerability 410 associated with both paths 160-1, $p_1$, and 160-2, $p_2$ and the corresponding source-sink pairs $\{n_1, n_{10}\}$ and $\{n_1, n_{11}\}$. It is further noted that the downgrading action 520-5 will correct the vulnerability 410-1' associated with the multiple paths from the set of sources 415-1' (sources A, A') to the set of sinks 420-1' (e.g., corresponding to source-sink pairs {A, B} and {A', B'}). This example also includes the warning that an attacker may be able to cause execution of "x.f" (as described above). As an additional example, the downgrading action 520-6 will correct the vulnerability associated with the multiple paths from the set of sources in 535-6 (sources A, A') to the set of sinks {C,C'} (e.g., corresponding to source-sink pairs {A, B} and {C, C'}). In the text corresponding to downgrading action 520-6, a warning is generated that an obfuscator, Obfuscator 1, is revealing information that is not properly obfuscated.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method, comprising:

using a static analysis, analyzing a software program to determine a plurality of paths from sources accepting information to sinks using that information or a modified version of that information and to determine multiple paths from the plurality of paths, where the determined multiple paths have a same transition from an application portion of the software program to a library portion of the software program and require a same downgrading action to address a vulnerability associated with source-sink pairs in the multiple paths, and where the analyzing comprises determining the plurality of paths using a path-sensitive analysis; and wherein determining the multiple paths using a path-sensitive analysis comprises:

determining control dependencies in the software program, each control dependency corresponding to two different branches of paths, wherein a first statement on a first of the two different branches of paths controls whether a second statement on the second of the two different branches of paths is executed;

splitting a state space to reflect the at least two branches of paths; and removing a selected path from the multiple paths, where the removed selected path corresponds to the second of the two different branches from the plurality of paths, in response to determining execution of the second statement is infeasible based on a state corresponding to the first statement;

for the determined multiple paths, grouping the determined multiple paths into a single representative indication of the determined multiple paths; and outputting the single representative indication.

2. The method of claim 1, wherein the single representative indication comprises an indication of at least one source and indications of a plurality of sinks.

3. The method of claim 1, further comprising determining the downgrading action corresponding to the source-sink pairs, and outputting an indication of the downgrading action.

4. The method of claim 1, further comprising determining the downgrading action corresponding to the source-sink pairs, and causing the downgrading action to be placed in the software program prior to the transition.

5. The method of claim 1, wherein all of the sources are in the application portion of the software program and all of the sinks are in the library portion of the software program.

6. The method of claim 1, wherein each rule in a set of rules comprises a set of sources, a set of sinks, and at least one downgrader, wherein the set of sources and set of sinks define the source-sink pairs, and wherein analyzing further comprises accessing the set of rules to determine for selected multiple source-sink pairs whether a selected downgrader corresponds to the selected multiple source-sink pairs and in response to the selected downgrader corresponding to the selected multiple source-sink pairs, determining that the same downgrading action addresses a vulnerability associated with the selected multiple source-sink pairs.

7. The method of claim 1, wherein the downgrading action comprises one or more of input validation or input modification with a purpose of vulnerability elimination.

8. The method of claim 1, wherein determining the multiple paths using a path-sensitive analysis further comprises propagating taint labels based on the control dependencies, and wherein removing the selected path further comprises removing a taint label corresponding to the first of the two different branches.

9. The method of claim 1, wherein determining the plurality of paths using a path-sensitive analysis further comprises determining whether an obfuscator in a determined one of the plurality of paths creates output that is properly obfuscated according to at least one condition, and in response to the output not being properly obfuscated, the outputting further comprises outputting indicia that the obfuscator is not performing proper obfuscation, the output indicia corresponding to the determined multiple paths having the obfuscator.

10. The method of claim 1, wherein:

determining the multiple paths using a path-sensitive analysis further comprises:

determining control dependencies in the software program, each control dependency corresponding to two different branches of paths, wherein a first statement on a first of the two different branches of paths controls whether a second statement on the second of the two different branches of paths is executed; and determining whether an attacker can control execution of the second statement, wherein the second statement performs a security-sensitive operation; and outputting further comprises outputting indicia that an attacker can control execution of the security-sensitive operation, the output indicia corresponding to the determined multiple paths having the second statement.

11. A computer program product, comprising:

a non-transitory computer readable storage medium having computer readable program code embodied therewith, the computer readable program code comprising:

code for, using a static analysis, analyzing a software program to determine a plurality of paths from sources accepting information to sinks using that information or a modified version of that information and to determine multiple paths from the plurality of paths, where the determined multiple paths have a same transition from an application portion of the software program to a library portion of the software program and require a same downgrading action to address a vulnerability associated with source-sink pairs in the multiple paths, and where the analyzing comprises determining the plurality of paths using a path-sensitive analysis; and wherein determining the multiple paths using a path-sensitive analysis comprises:

determining control dependencies in the software program, each control dependency corresponding to two different branches of paths, wherein a first statement on a first of the two different branches of paths controls whether a second statement on the second of the two different branches of paths is executed;

splitting a state space to reflect the at least two branches of paths; and removing a selected path from the multiple paths, where the removed selected path corresponds to the second of the two different branches from the plurality of paths, in response to determining execution of the second statement is infeasible based on a state corresponding to the first statement;

code for, for the determined multiple paths, grouping the determined multiple paths into a single representative indication of the determined multiple paths; and code for outputting the single representative indication.

12. An apparatus, comprising:
at least one memory comprising computer code; and
at least one processor,
wherein the computer code, when executed by the at least one processor, cause the apparatus to perform at least the following:
using a static analysis, analyzing a software program to determine a plurality of paths from sources accepting information to sinks using that information or a modified version of that information and to determine multiple paths from the plurality of paths, where the determined multiple paths have a same transition from an application portion of the software program to a library portion of the software program and require a same downgrading action to address a vulnerability associated with source-sink pairs in the multiple paths, and where the analyzing comprises determining the plurality of paths using a path-sensitive analysis; and
wherein determining the multiple paths using a path-sensitive analysis comprises:
determining control dependencies in the software program, each control dependency corresponding to two different branches of paths, wherein a first statement on a first of the two different branches of paths controls whether a second statement on the second of the two different branches of paths is executed;
splitting a state space to reflect the at least two branches of paths; and
removing a selected path from the multiple paths, where the removed selected path corresponds to the second of the two different branches from the plurality of paths, in response to determining execution of the second statement is infeasible based on a state corresponding to the first statement;
for the determined multiple paths, grouping the determined multiple paths into a single representative indication of the determined multiple paths; and
outputting the single representative indication.

13. The apparatus of claim 12, wherein the single representative indication comprises an indication of at least one source and indications of a plurality of sinks.

14. The apparatus of claim 12, wherein the computer code, when executed by the at least one processor, further causes the apparatus to perform at least the following:
determining the downgrading action corresponding to the source-sink pairs, and outputting an indication of the downgrading action.

15. The apparatus of claim 12, wherein the computer code, when executed by the at least one processor, further causes the apparatus to perform at least the following:
determining the downgrading action corresponding to the source-sink pairs, and causing the downgrading action to be placed in the software program prior to the transition.

16. The apparatus of claim 12, wherein all of the sources are in the application portion of the software program and all of the sinks are in the library portion of the software program.

17. The apparatus of claim 12, wherein each rule in a set of rules comprises a set of sources, a set of sinks, and at least one downgrader, wherein the set of sources and set of sinks define the source-sink pairs, and wherein analyzing further comprises accessing the set of rules to determine for selected multiple source-sink pairs whether a selected downgrader corresponds to the selected multiple source-sink pairs and in response to the selected downgrader corresponding to the selected multiple source-sink pairs, determining that the same downgrading action addresses a vulnerability associated with the selected multiple source-sink pairs.

18. The apparatus of claim 12, wherein the downgrading action comprises one or more of input validation or modification with a purpose of vulnerability elimination.

19. The apparatus of claim 12, wherein determining the multiple paths using a path-sensitive analysis further comprises propagating taint labels based on the control dependencies, and wherein removing the selected path further comprises removing a taint label corresponding to the first of the two different branches.

20. The apparatus of claim 12, wherein determining the plurality of paths using a path-sensitive analysis further comprises determining whether an obfuscator in a determined one of the plurality of paths creates output that is properly obfuscated according to at least one condition, and in response to the output not being properly obfuscated, the outputting further comprises outputting indicia that the obfuscator is not performing proper obfuscation, the output indicia corresponding to the determined multiple paths having the obfuscator.

21. The apparatus of claim 12, wherein:
determining the multiple paths using a path-sensitive analysis further comprises:
determining control dependencies in the software program, each control dependency corresponding to two different branches of paths, wherein a first statement on a first of the two different branches of paths controls whether a second statement on the second of the two different branches of paths is executed; and
determining whether an attacker can control execution of the second statement, wherein the second statement performs a security-sensitive operation; and
outputting further comprises outputting indicia that an attacker can control execution of the security-sensitive operation, the output indicia corresponding to the determined multiple paths having the second statement.

* * * * *